US012768421B2

(12) United States Patent
Tucovic et al.

(10) Patent No.: US 12,768,421 B2
(45) Date of Patent: Oct. 20, 2026

(54) MOTOR VEHICLE VIBRATION DAMPER

(71) Applicant: ZF FRIEDRICHSHAFEN AG, Friedrichshafen (DE)

(72) Inventors: Harun Tucovic, Schweinfurt (DE); Eberhard Simon, Gochsheim (DE); Barbara Ester, Schweinfurt (DE); Artur Schell, Bad Neustadt a. d. Saale (DE); Frank Gundermann, Schonungen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 421 days.

(21) Appl. No.: 18/287,575

(22) PCT Filed: Apr. 29, 2022

(86) PCT No.: PCT/EP2022/061465
§ 371 (c)(1),
(2) Date: Oct. 19, 2023

(87) PCT Pub. No.: WO2022/233723
PCT Pub. Date: Nov. 10, 2022

(65) Prior Publication Data

US 2024/0384774 A1 Nov. 21, 2024

(30) Foreign Application Priority Data

May 4, 2021 (DE) .................... 10 2021 204 442.5

(51) Int. Cl.
*F16F 9/092* (2006.01)
*F16F 9/06* (2006.01)
(Continued)

(52) U.S. Cl.
CPC .............. *F16F 9/092* (2013.01); *F16F 9/065* (2013.01); *F16F 9/34* (2013.01); *F16F 9/364* (2013.01);
(Continued)

(58) Field of Classification Search
CPC .... F16F 9/092; F16F 9/065; F16F 9/34; F16F 9/364; F16F 9/432; F16F 2222/126; F16F 2226/04; F16F 2230/06; F16F 2230/30
(Continued)

(56) References Cited

U.S. PATENT DOCUMENTS 2,850,276 A 9/1958 Jackson
3,033,556 A 5/1962 Woessner
(Continued)

FOREIGN PATENT DOCUMENTS

DE 10 56 487 A 4/1959
DE 11 17412 A 11/1961
(Continued)

*Primary Examiner* — Christopher P Schwartz
(74) *Attorney, Agent, or Firm* — COZEN O'CONNOR

(57) ABSTRACT

Motor vehicle vibration damper with at least one damper cylinder at least partially filled with a liquid damping medium; a piston rod axially movable to the longitudinal extension axis (L) of the damper and sections of which project into the damper cylinder; a piston rod guide surrounding the piston rod in the peripheral direction and seals off the damper cylinder; a gas-impermeable, shape-changing gas pressure container located in a compensation chamber inside the damper cylinder; a filling channel connecting the interior of the gas pressure container to the external environment; and a non-return valve at least indirectly connected to the gas pressure container and closes or opens the filling channel depending on gas pressure difference. The non-return valve is inside a gas-impermeable non-return valve housing connected to the piston rod guide.

11 Claims, 2 Drawing Sheets

(51) Int. Cl.
*F16F 9/34* (2006.01)
*F16F 9/36* (2006.01)
*F16F 9/43* (2006.01)

(52) U.S. Cl.
CPC ........ *F16F 9/432* (2013.01); *F16F 2222/126* (2013.01); *F16F 2226/04* (2013.01); *F16F 2230/06* (2013.01); *F16F 2230/30* (2013.01)

(58) Field of Classification Search
USPC ................ 188/315, 322.21, 322.16–322.18; 267/64.28
See application file for complete search history.

(56) References Cited

U.S. PATENT DOCUMENTS 3,034,527 A * 5/1962 Hennells ............ F16K 15/1823 137/515.5
3,379,430 A * 4/1968 Hennells .............. F16F 9/0209 267/126
4,257,580 A * 3/1981 Schnitzius ................ F16F 9/43 267/64.28
4,700,815 A 10/1987 Persicke
4,813,655 A * 3/1989 Hennells ............... F16K 15/044 251/63.4
6,467,760 B2 10/2002 Lutz
6,648,309 B2 11/2003 Beck
7,097,015 B2 * 8/2006 Beck ......................... F16F 9/43 188/315
7,487,863 B2 * 2/2009 Ackermann ............ F16F 9/092 188/277
9,879,748 B2 * 1/2018 Roessle ................... F16F 9/342
2009/0066041 A1 3/2009 Kirchner
2021/0108698 A1 * 4/2021 Wilk ..................... F16F 9/3221

FOREIGN PATENT DOCUMENTS

DE 101 04 358 10/2002
DE 103 04 915 8/2004
DE 10 2004 053 401 5/2006
DE 10 2005 005 789 8/2006
DE 10 2006 011 397 6/2007
DE 10 2007 058 544 8/2008
DE 10 2016 208 454 11/2017
EP 0 150 104 B1 7/1984
GB 1044102 9/1966

* cited by examiner

MOTOR VEHICLE VIBRATION DAMPER

PRIORITY CLAIM

This is a U.S. national stage of application No. PCT/EP2022/061465, filed on Apr. 29, 2022. Priority is claimed on German Application No. 10 2021 204 442.5, filed May 4, 2021 the content of which is incorporated herein by reference.

BACKGROUND OF THE INVENTION

The present invention relates to a motor vehicle vibration damper according to the preamble of patent claim 1.

A generic motor vehicle vibration damper is well known from the prior art. For example, DE 10 2004 053 401 A1, DE 10 2006 011 397 B3, DE 10 2016 208 454 A1, and DE 10 2005 005 789 A1 each disclose a motor vehicle vibration damper comprising at least one damping cylinder that is at least partially filled with a liquid damping medium, a piston rod that is axially movable with respect to the longitudinal axis of the motor vehicle vibration damper and protrudes sectionally into the damping cylinder, a piston rod guide that encloses the piston rod in the circumferential direction and seals the damping cylinder to the outside, a gas-impermeable, shape-changing gas pressure container that is arranged in a compensation chamber within the damping cylinder and comprises a filling channel that connects the gas pressure container interior to the outside environment, and a check valve that opens or closes the filling channel depending on a gas pressure difference between the gas pressure inside and outside the gas pressure container interior.

Since the filling channel usually runs at least sectionally through the piston rod guide itself, and the check valve is directly formed in the piston rod guide, it is necessary in all the aforementioned constructions for the piston rod guide to be made of a gas-impermeable, high-grade material, so that the gas cannot escape from the gas pressure container in an uncontrolled manner after the gas pressure container has been filled. The piston rod guide in this case is typically produced from metal using a suitable machining method. Both the material and the production method, which is associated with high production costs, contribute to an increase in the final price of the motor vehicle vibration damper.

SUMMARY OF THE INVENTION

The present invention is based on the object of providing an alternative motor vehicle vibration damper that is easy and cost-effective to produce.

According to an embodiment, a motor vehicle vibration damper is described having at least one damping cylinder that is at least partially filled with a liquid damping medium, a piston rod that is axially movable with respect to the longitudinal axis (L) of the motor vehicle vibration damper and protrudes sectionally into the damping cylinder, a piston rod guide that encloses the piston rod in the circumferential direction and seals the damping cylinder to the outside, a gas-impermeable, shape-changing gas pressure container, wherein the gas pressure container is arranged in a compensation chamber within the damping cylinder, a filling channel that connects the gas pressure container interior to the outside environment, and a check valve which is at least indirectly connected to the gas pressure container and which opens or closes the filling channel depending on a gas pressure difference between the gas pressure within the gas pressure container interior and the gas pressure outside the gas pressure container interior. The check valve is designed within a gas-impermeable check valve housing which is connected to the piston rod guide in a form-fitting and/or substance-bonded manner.

When the check valve is designed within a gas-impermeable check valve housing which is connected to the piston rod guide in a form-fitting and/or substance-bonded manner, uncontrolled leakage of the gas from the gas container can be prevented, regardless of the nature of the piston rod guide.

According to another advantageous embodiment, the piston rod guide can be produced with the help of a sintering process, which substantially minimizes the material costs and the manufacturing costs of the piston rod guide.

Moreover, it can advantageously be provided that the gas pressure container comprises a connection piece inseparably connected thereto which forms the check valve housing of the check valve. The number of components is thereby reduced, resulting in further cost reduction.

Alternatively, the gas pressure container may comprise a connection piece inseparably connected thereto, and the check valve may be designed as a separate component and connected to the connection piece in a form-fitting and/or substance-bonded manner to form a common unit. This allows each component, connection piece, and/or check valve to be advantageously produced from the most suitable material for its function in each case, and to be assembled into a common unit.

According to another advantageous embodiment, it is provided that the check valve is designed and arranged in such a manner that the check valve housing thereof extends right through the piston rod guide in the installed state. In this way, a gas leakage during the filling of the gas pressure container can easily be prevented. It is irrelevant in this case whether the check valve housing is formed by the connection piece or as a separate component. It can therefore likewise be provided that a unit consisting of the connection piece and the check valve extends right through the piston rod guide in the installed state.

In all of the embodiments described above, the direction of extent of the check valve housing and/or of the connection piece may be axially and/or radially aligned together or independently of one another.

In order to achieve an advantageously very simple fastening of the connection piece to the piston rod guide, according to another exemplary embodiment it is provided that the connection piece and the piston rod guide each have a corresponding configuration relative to one another at least in sections, so that they create a common form-fit arrangement when the motor vehicle vibration damper is in the assembled state.

Similarly, it may advantageously be provided that the check valve housing of the check valve and the piston rod guide each have a corresponding embodiment relative to one another, at least in sections, so that they form a very simply executed common form-fit arrangement when the motor vehicle vibration damper is in the assembled state.

An alternative is also provided, according to which the unit consisting of the connection piece and the check valve and the piston rod guide each have a corresponding configuration relative to one another, at least in sections, so that they form a common form-fit arrangement when the motor vehicle vibration damper is in the assembled state.

In all the embodiments shown above, the common form-fit arrangement can be created either by an axial and/or by a radial relative movement of the components thereof in respect of one another.

DETAILED DESCRIPTION OF THE PRESENTLY PREFERRED EMBODIMENTS

All figures show a sectional representation of details in each case of a motor vehicle vibration damper, wherein the region of the motor vehicle vibration damper with the installed piston rod guide was selected for viewing.

Figure 1:
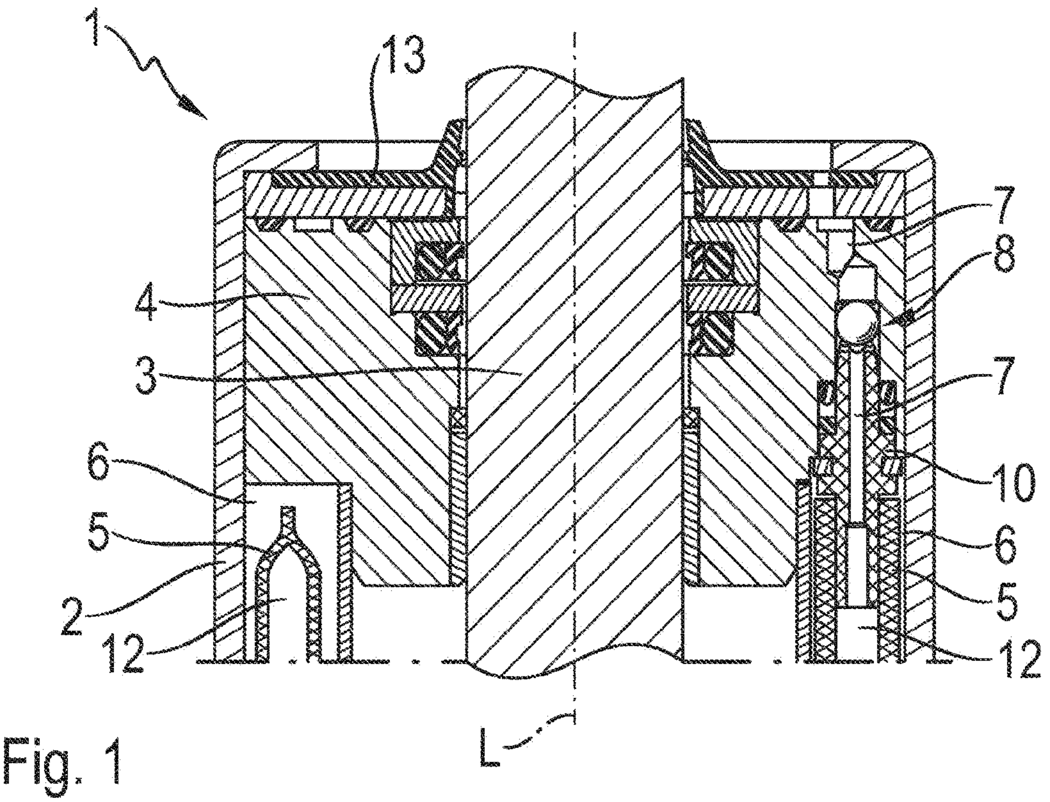
FIG. 1: shows a sectional representation of a generic motor vehicle vibration damper, in the region of the piston rod guide, according to the prior art.

FIG. 1 shows a sectional representation of a detail of a motor vehicle vibration damper 1 executed according to the prior art. This comprises a damping cylinder 2 at least partially filled with a liquid damping medium. A piston rod 3 is mounted axially movably in relation to the longitudinal axis L of the motor vehicle vibration damper 1 and partially protrudes through a piston rod guide 4 into the damping cylinder 2, or out of the damping cylinder 2.

The piston rod guide 4 encloses the piston rod 3 in the circumferential direction and seals the damping cylinder 2 to the outside with the help of a piston rod seal 13 attached to the piston rod guide 4. A compensation chamber 6 is arranged within the damping cylinder 2, within which compensation chamber a gas-impermeable, shape-changing gas pressure container 5 is positioned.

A filling channel 7 consisting of multiple openings and/or bores connects the gas pressure container interior 12 to the outside environment, and is primarily used for filling the gas pressure container 5 with a gas. The filling channel 7 is directly integrated in the piston rod guide 4, at least in sections.

Furthermore, FIG. 1 shows a check valve 8, which is at least indirectly connected to the gas pressure container 5 and which opens or closes the filling channel 7 depending on a gas pressure difference between the gas pressure within the gas pressure container interior and the gas pressure outside the gas pressure container interior 12. The check valve 8 is directly arranged in the piston rod guide 4, within the filling channel 7.

Figure 2:
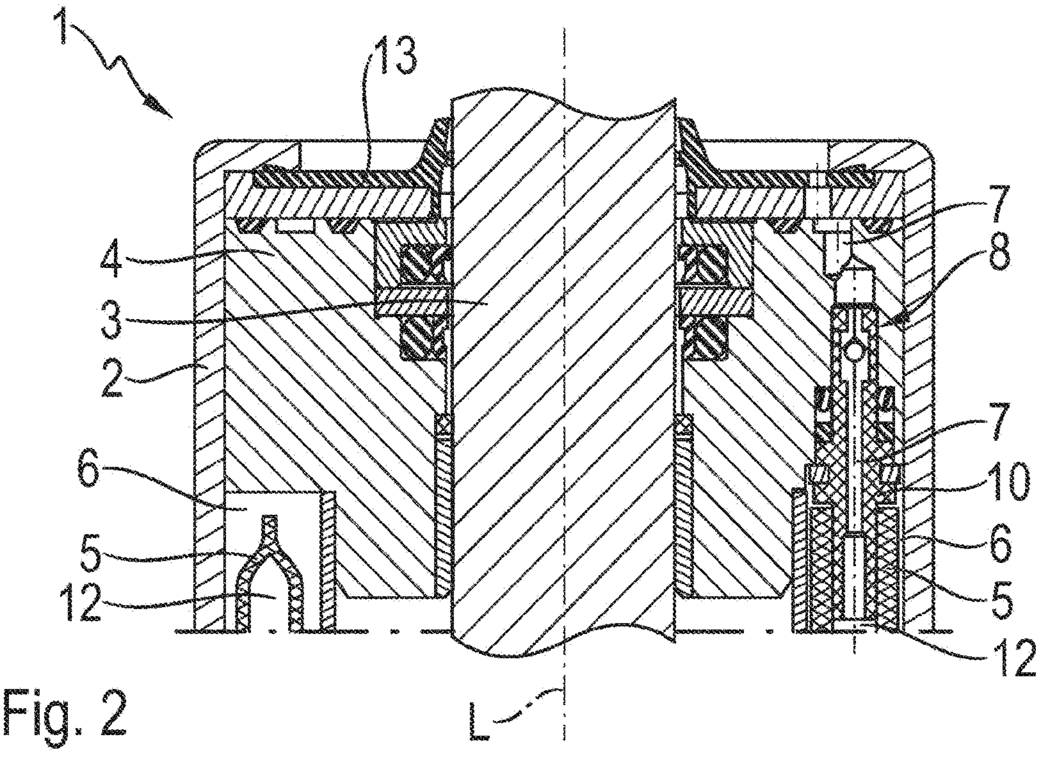
FIG. 2: shows a sectional representation of a first exemplary embodiment of a motor vehicle vibration damper.
Figure 3:
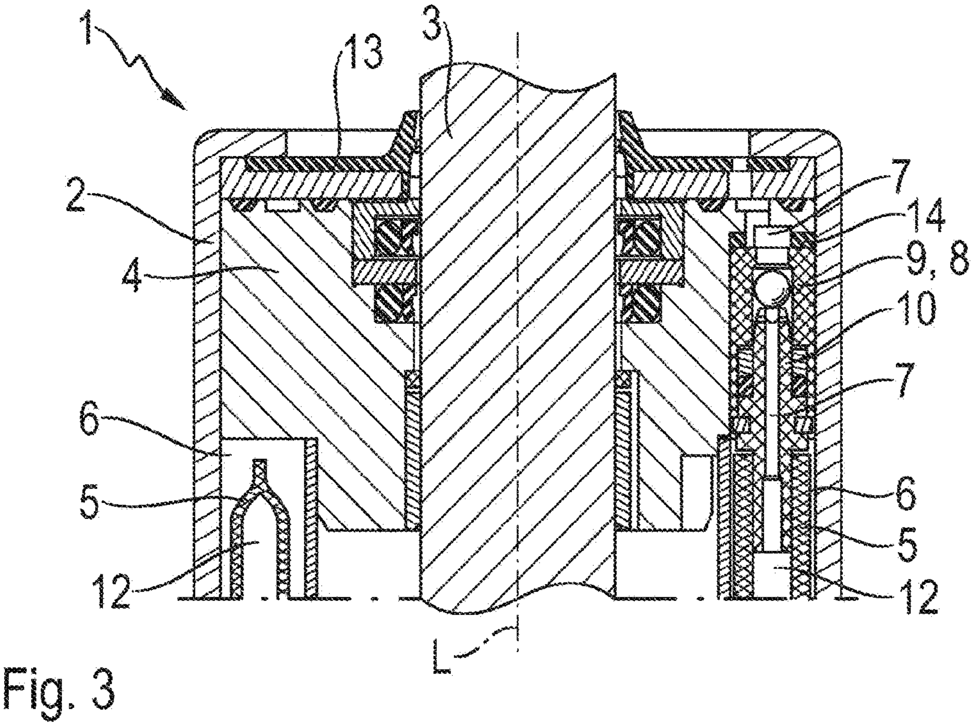
FIG. 3: shows a sectional representation of another exemplary embodiment of a motor vehicle vibration damper.
Figure 4:
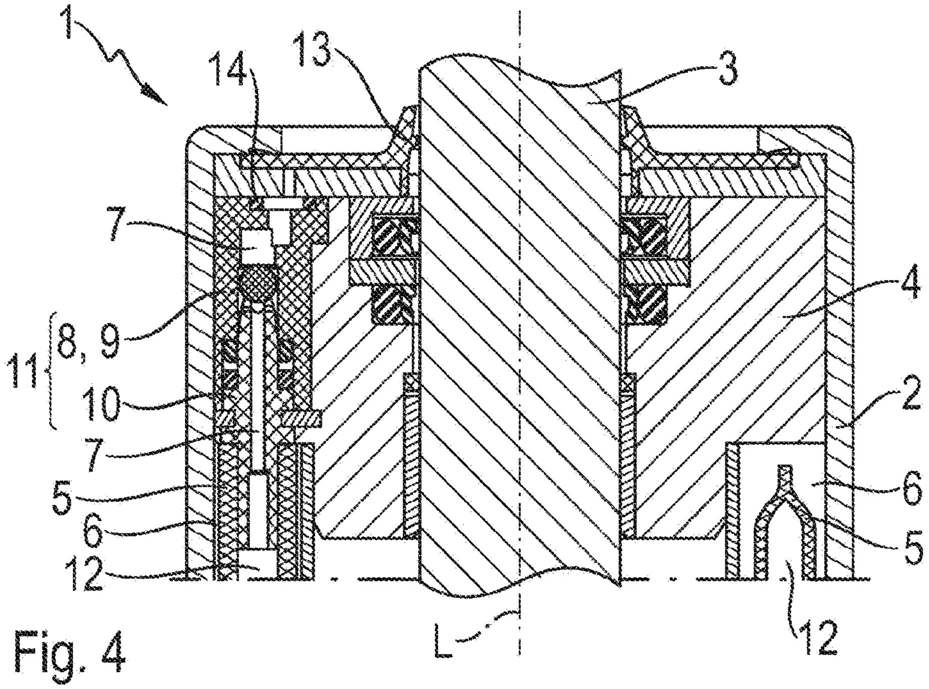
FIG. 4: shows a sectional representation of another exemplary embodiment of a motor vehicle vibration damper.

On the other hand, FIGS. 2 to 4 each show by way of example a first possible embodiment of a motor vehicle vibration damper according to the invention. The motor vehicle vibration damper designed according to FIGS. 2 to 4 envisages that the check valve 8 is integrated within a gas-impermeable check valve housing, which is connected to the piston rod guide 4 in a form-fitting and/or substance-bonded manner.

According to the embodiment in FIG. 2, the gas pressure container 5 comprises a connection piece 10 inseparably connected thereto. A check valve 8 is arranged within the connection piece 10, so the connection piece 10 forms the check valve housing 9 for the check valve 8. The connection piece 10 and the piston rod guide 4 each have a corresponding configuration relative to one another and are connected to one another by an axial and/or radial relative movement, so that they create a common form-fit arrangement in the assembled state. To prevent a usually liquid damping medium from entering the check valve 8, a sealing element 14 is arranged between the connection piece 10 and the piston rod guide 4.

The constructions according to FIGS. 3 and 4 also provide that the gas pressure container 5 comprises a connection piece 10 inseparably connected thereto. The difference from FIG. 2 lies in the fact that in FIGS. 3 and 4 the check valve 8 is designed as a separate component. This means that the check valve 8 also has its own separately designed check valve housing 9, which can be connected to the connection piece 10 in a form-fitting and/or substance-bonded manner to form a common unit 11, as shown in FIGS. 3 and 4.

FIG. 3 shows an embodiment in which the unit 11 comprising the connection piece 10 and the check valve 8 with the check valve housing 9 extends through only part of the piston rod guide 4 axially and/or radially. As an alternative to this, FIG. 4 shows an embodiment which provides for the unit 11 consisting of the connection piece 10 and the check valve 8 to extend right through the piston rod guide 4 in the installed state. The direction of extent of the check valve housing 9 of the check valve 8 and/or of the connection piece 10 may be axially and/or radially aligned together or independently of one another.

Furthermore, although it is not shown in the figures, it can nevertheless be provided that the check valve 8 is designed and arranged in such a manner that only the check valve housing 9 thereof extends right through the piston rod guide 4 in the installed state. This is the case, for example, when the connection piece 10 is attached outside the piston rod guide 4, or when the check valve housing 9 is formed by the connection piece 10.

In any event, both the connection piece 10 and the check valve housing 9 of the check valve 8 and the piston rod guide 4 each have a corresponding configuration relative to one another, so that the connection piece 10 and/or the check valve housing 9 of the check valve 8 create a common form-fit arrangement with one another and/or with the piston rod guide 4 when the motor vehicle vibration damper 1 is in the assembled state.

All variants executed according to the invention have the advantage that they can be used irrespective of the gas permeability of the piston rod guide 4 to prevent an uncontrolled loss of gas. The piston rod guide 4 can therefore be produced to be gas-impermeable or also gas-permeable with the help of a sintering process, for example, which would substantially reduce the production costs of the motor vehicle vibration damper 1.

The invention claimed is:

1. A motor vehicle vibration damper, comprising:

at least one damping cylinder that is at least partially filled with a liquid damping medium, a piston rod that is axially movable with respect to a longitudinal axis (L) of the motor vehicle vibration damper and protrudes sectionally into the damping cylinder, a piston rod guide that encloses the piston rod in a circumferential direction and seals the damping cylinder to an outside environment, a gas-impermeable, shape-changing gas pressure container, wherein the gas pressure container is arranged in a compensation chamber within the damping cylinder, a filling channel that connects a gas pressure container interior to the outside environment, and a check valve which is at least indirectly connected to the gas pressure container and which opens or closes the filling channel depending on a gas pressure difference between the gas pressure within the gas pressure container interior and the gas pressure outside the gas pressure container interior, wherein the check valve is arranged in a gas-impermeable check valve housing which is connected to the piston rod guide in a form-fitting and/or substance-bonded manner, wherein the gas-impermeable check valve housing extends completely through the piston rod guide in an installed state.

2. The motor vehicle vibration damper as claimed in claim 1, wherein the gas pressure container comprises a connection piece inseparably connected thereto which forms the check valve housing of the check valve.

3. The motor vehicle vibration damper as claimed in claim 2, wherein the connection piece and the piston rod guide each have a corresponding configuration relative to one another at least in sections, so that they create a common form-fit arrangement when the motor vehicle vibration damper is in an assembled state.

4. The motor vehicle vibration damper as claimed in claim 3, wherein the common form-fit arrangement is created by an axial and/or by a radial relative movement of the piston rod guide and connection piece and/or check valve relative to one another.

5. The motor vehicle vibration damper as claimed in claim 1, wherein a unit consisting of a connection piece and the check valve extends right through the piston rod guide in the installed state.

6. The motor vehicle vibration damper as claimed in claim 5, wherein the unit consisting of the connection piece and the check valve and the piston rod guide each have a corresponding configuration relative to one another, at least in sections, so that they form a common form-fit arrangement when the motor vehicle vibration damper is in an assembled state.

7. The motor vehicle vibration damper as claimed in claim 6, wherein the common form-fit arrangement is created by an axial and/or by a radial relative movement of the piston rod guide and connection piece and/or check valve relative to one another.

8. The motor vehicle vibration damper as claimed in claim 1, wherein the check valve housing of the check valve and the piston rod guide each have a corresponding configuration relative to one another, at least in sections, so that they form a common form-fit arrangement when the motor vehicle vibration damper is in an assembled state.

9. The motor vehicle vibration damper as claimed in claim 8, wherein the common form-fit arrangement is created by an axial and/or by a radial relative movement of the piston rod guide and connection piece and/or check valve relative to one another.

10. The motor vehicle vibration damper as claimed in claim 1, wherein the piston rod guide is produced with the help of a sintering process.

11. The motor vehicle vibration damper as claimed in claim 1, wherein the gas pressure container comprises a connection piece inseparably connected thereto, and wherein the check valve is designed as a separate component and connected to the connection piece in one of a form-fitting and substance-bonded manner to form a common unit.

* * * * *